(12) United States Patent
Svenningsson et al.

(10) Patent No.: US 7,972,091 B2
(45) Date of Patent: Jul. 5, 2011

(54) MILLING TOOL, A CUTTING INSERT FOR MILLING TOOL AS WELL AS A SOLID MILLING TOOL

(75) Inventors: Inge Svenningsson, Sandviken (SE); Mikael Lundblad, Gävle (SE); Jan Johansson, Sandviken (SE); Magnus Åström, Sandviken (SE); David Öhlund, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 705 days.

(21) Appl. No.: 11/661,325

(22) PCT Filed: Sep. 2, 2005

(86) PCT No.: PCT/SE2005/001273
§ 371 (c)(1),
(2), (4) Date: May 30, 2008

(87) PCT Pub. No.: WO2006/041353
PCT Pub. Date: Apr. 20, 2006

(65) Prior Publication Data
US 2008/0273930 A1    Nov. 6, 2008

(30) Foreign Application Priority Data
Sep. 6, 2004    (SE) ........................... 0402149

(51) Int. Cl.
*B23P 15/28* (2006.01)
(52) U.S. Cl. .................. 407/113; 407/114; 407/116

(58) Field of Classification Search .................. 407/113, 407/114, 116, 115, 49, 53, 54
See application file for complete search history.

(56) References Cited

U.S. PATENT DOCUMENTS

| 5,078,550 | A | * | 1/1992 | Satran et al. ................ 407/34 |
| 5,199,827 | A | * | 4/1993 | Pantzar ..................... 407/42 |
| 5,593,255 | A | * | 1/1997 | Satran et al. ............... 407/113 |
| 5,947,650 | A | * | 9/1999 | Satran et al. ............... 407/113 |
| 6,142,716 | A | | 11/2000 | Jordberg et al. |
| 6,234,726 | B1 | | 5/2001 | Okada et al. |
| 6,929,427 | B2 | * | 8/2005 | Satran ....................... 407/42 |
| 7,637,701 | B2 | * | 12/2009 | Pantzar ..................... 407/113 |

FOREIGN PATENT DOCUMENTS
EP    0 956 921    11/1999
WO    02/055245    7/2002

* cited by examiner

*Primary Examiner* — Boyer D Ashley
*Assistant Examiner* — Omar Flores-Sánchez
(74) *Attorney, Agent, or Firm* — Drinker Biddle & Reath LLP (57) ABSTRACT

A milling tool intended for chip-removing machining includes a basic body rotatable around a geometrical centre axis and peripherically spaced-apart, detachable cutting inserts, which separately are securable in insert pockets adjacent to chip channels formed in the basic body. The individual cutting insert have at least one edge formed between a chip surface on the top side of the cutting insert and a clearance surface along the periphery side of the cutting insert, and the individual insert pocket is arranged to secure the individual cutting insert in a position in which the chip surface is inclined in relation to the centre axis while forming a positive angle of inclination.

18 Claims, 6 Drawing Sheets

MILLING TOOL, A CUTTING INSERT FOR MILLING TOOL AS WELL AS A SOLID MILLING TOOL

TECHNICAL FIELD OF THE INVENTION

In a first aspect, this invention relates to a milling tool intended for chip-removing machining, comprising a basic body rotatable around a geometrical centre axis and a plurality of peripherically spaced-apart, detachable cutting inserts, which separately are securable in insert pockets adjacent to chip channels formed in the basic body, the individual cutting insert having at least one edge formed between a chip surface on the top side of the cutting insert and a clearance surface along the periphery side of the cutting insert, the tool geometry being markedly positive so far that the individual insert pocket is arranged to secure the individual cutting insert in a position in which the chip surface is inclined in relation to the centre axis while forming a positive angle of inclination.

In a second aspect, the invention also relates to a cutting insert for the milling tool.

In a third aspect, the invention relates to a solid milling tool.

GENERAL STATE OF THE ART

Within the field of cutting or chip-removing machining, a number of various milling tools are found, by means of which, above all, metallic workpieces can be machined. Milling tools of the above generally mentioned kind, so-called milling tools of router type, are usually used for providing, in workpieces, pockets or hollow spaces that are delimited by comparatively thin walls. Such milling tools are particularly frequently used to machine aluminium with the purpose of providing light framework components of the type that are used for the construction of aircrafts. In these connections, a variety of different requirements are made on the milling tools and the cutting inserts thereof, a most important one of these requirements being great chip-removing capacity.

Within the technology in question, the development is intensively pushed in the direction of faster and faster cutting processes. In milling in aluminium, today machining may take place at cutting or periphery speeds up to the order of 10 000 m/min or more, wherein the number of revolutions of the milling cutters may exceed 25 000 rpm. A usual limitation for the achievement of high cutting speeds, and thereby also high milling speeds, is available power in the spindle, in which the milling tool is mounted. In order to achieve higher cutting speed, when a limitation exists in terms of available power in the milling spindle, it is previously known to decrease the radius of curvature of the cross section-wise arc-shape of the cutting edge as well as to increase the angle of inclination of the chip surface in relation to the geometrical centre axis of the milling tool, which usually coincides with the rotation axis of the milling tool. However, these two measures have a detrimental effect on the strength of the cutting edge and accordingly limit the service life of the milling tool.

OBJECTS AND FEATURES OF THE INVENTION

The present invention aims at obviating the above-mentioned disadvantages and at providing an improved milling tool of the type initially mentioned. Thus, a primary object of the invention is to provide a milling tool, by means of which an improved chip-removing capacity in comparison with previously known tools is achievable. An additional object is to provide a milling tool that enables improved chip-removing capacity in particular in machining of material having a comparatively low modulus of elasticity, e.g., such materials as aluminium or the like. Yet an object of the invention is to provide a milling tool that has a more easy-cutting geometry with maintained strength of the cutting edge in relation to previously known milling tools.

According to the invention, at least the primary object is attained by a milling tool having the features defined in the characterizing clause of claim 1. Preferred embodiments of the milling tool according to the invention are further defined in the dependent claims 2-7.

In a second aspect, the invention relates to a milling insert having the features defined in claim 8. Preferred embodiments of the milling insert according to the invention are further defined in the dependent claims 9-16.

In a third aspect, the invention also relates to a solid milling tool having the features according to claim 17.

Recently acquired knowledge, which forms the basis of the present invention, has shown that the provision of, on one hand, a reinforcement bevel having the inclination and extension defined according to claim 1, and on the other hand a clearance bevel having the inclination and extension defined according to claim 1, allows the design of the cross section-wise arched cutting edge having such a small radius of curvature as 5-20 μm with maintained strength of the cutting edge. In other words, the edge may be designed much sharper without the strength thereby becoming impaired. Likewise recently acquired knowledge, which also forms the basis of the present invention, has shown that the provision of the angle of inclination between the chip surface and the centre axis within the range of 25-28°, in combination with the above-mentioned features, gives a tool geometry being very easy-cutting and well-suited for the machining of materials having comparatively low modulus of elasticity, e.g., aluminium. Thus, this more easy-cutting geometry enables higher milling speeds at limited power of the spindle in which the milling tool is intended to be mounted.

The existence of reinforcement bevel, clearance bevel, cross section-wise arched cutting edge, and angle of inclination of the chip surface are separately previously known features within the field of chip-removing machining. Thus, the invention is based on a new, unique combination of these features that together gives the milling tool according to the invention an exceptionally high, in relation to known milling tools, improved chip-removing speed.

DETAILED DESCRIPTION OF PREFERRED EMBODIMENTS OF THE INVENTION

Figure 1:
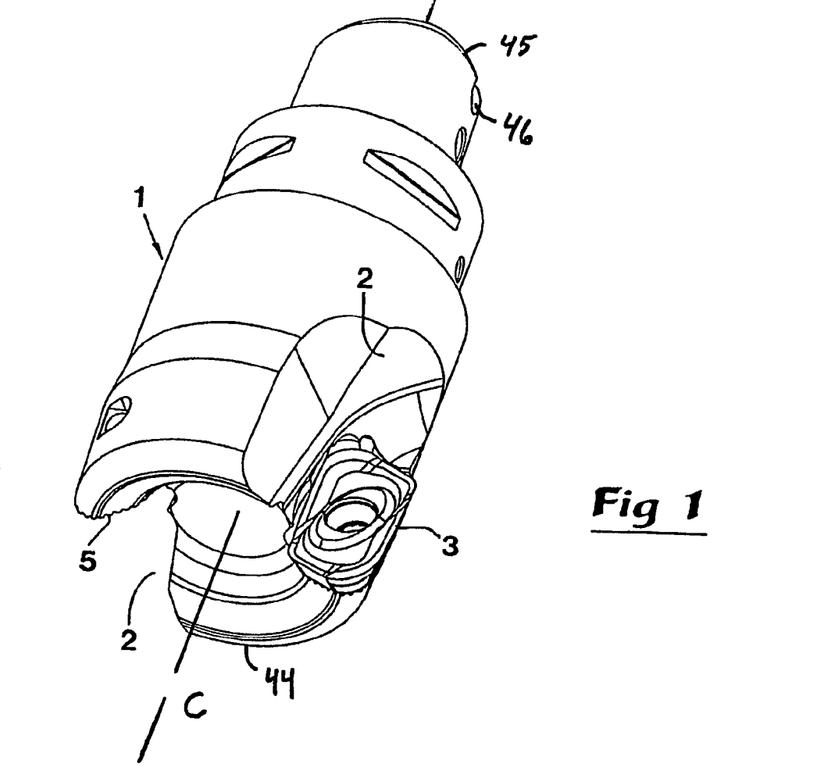
FIG. 1 is a perspective view of a milling tool according to a preferred embodiment of the invention.
Figure 2:
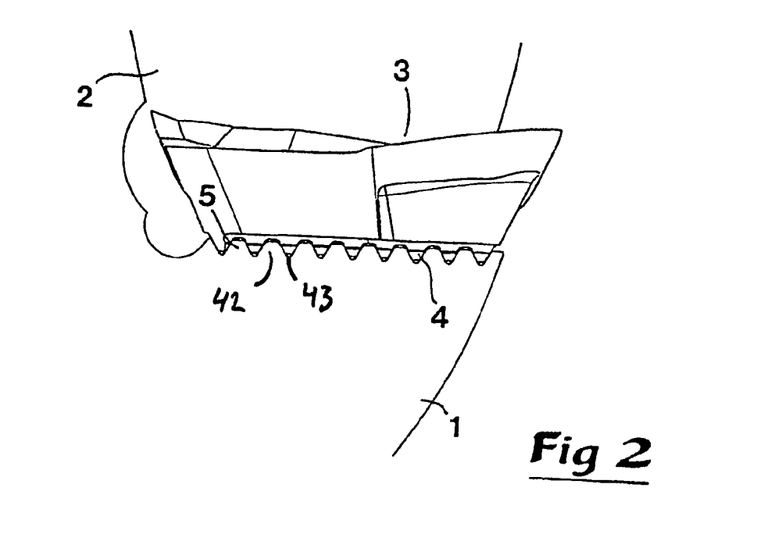
FIG. 2 is an enlarged, partly cut end view showing the cutting insert included in the milling tool from an end of the milling tool.

In FIG. 1, a milling tool according to a preferred embodiment of the invention is shown, comprising a basic body 1 having rotationally symmetrical basic shape, which has a front end surface 44 and a rear end surface 45 including means, e.g., a recess 46, for the connection of the basic body 1 to a driving spindle. The basic body is rotatable around a geometrical centre axis C. In the envelope surface of the basic body 1, two chip channels 2 are formed. In one of these chip channels, a milling insert 3 according to an embodiment of the invention is mounted. In FIG. 2, it is seen how the cutting insert 3 on a bottom side has at least one connecting surface 4 of the type that includes a plurality of parallel ridges spaced apart via grooves and having cross section-wise tapering shape. This connecting surface is intended to co-operate with a similar, ridge-provided connecting surface 5, which is arranged in the basic body 1 and forms an insert pocket 5 or seat in the chip channel 2. It should be pointed out already here that this is only one feasible way of securing the cutting insert 3 in the insert pocket. Optional other expedient way of securing of the cutting insert, for instance by means of a clamp, may naturally be used within the scope of the present invention.

Reference is now made to FIGS. 3-10, which in detail illustrate the design of a milling insert according to a preferred embodiment of the invention. The cutting insert has a polygonal basic shape and has a top side generally designated 11, a bottom side 12, as well as four peripherical sides 13, 14. Of these periphery sides, a pair of first, opposite sides 13 meet the second pair of mutually opposite sides 14 in two acute corners 15 as well as two obtuse corners 16. Between chip surfaces 17 on the top side of the cutting insert and clearance surfaces 18 along the periphery sides, cutting edges generally designated 19 are formed. Below, these are denominated primary cutting edges. Each individual primary cutting edge 19 includes a major-edge portion 20, as well as a minor-edge portion 21 formed adjacent to an acute corner 15 and having markedly round, e.g., partially circular shape. The major-edge portion 20 extends from a first or front end point 22 to a rear end point 23. The rounded minor-edge portion 21 extends in extension of the major-edge portion 20, more precisely from the point 22 to a point 24.

Furthermore, it should already now be pointed out that the tool geometry is markedly positive so far that the individual insert pocket is arranged to secure the individual cutting insert 3 in a position in which the chip surface 17 is inclined in relation to the centre axis C while forming a positive angle of inclination, i.e., in mounted state, the cutting insert 3 has a marked radial angle in relation to the centre axis. In the embodiment illustrated in FIGS. 1-10, in mounted state, the cutting insert 3 also has a marked axial angle in relation to the centre axis. The axial and radial angles are determined by the angles of the insert pocket or of the connecting surface 5 in relation to the rotation axis C of the basic body 1 of the milling tool. In preferred embodiments, the axial angle of the connecting surface 5 is within the range of 10-15°, while the radial angle may be within the range of 10-25°. Thus, in mounted state, the major-edge portion 20 of the cutting edge 19 extends substantially in the same longitudinal direction as the centre axis C.

Figure 5:
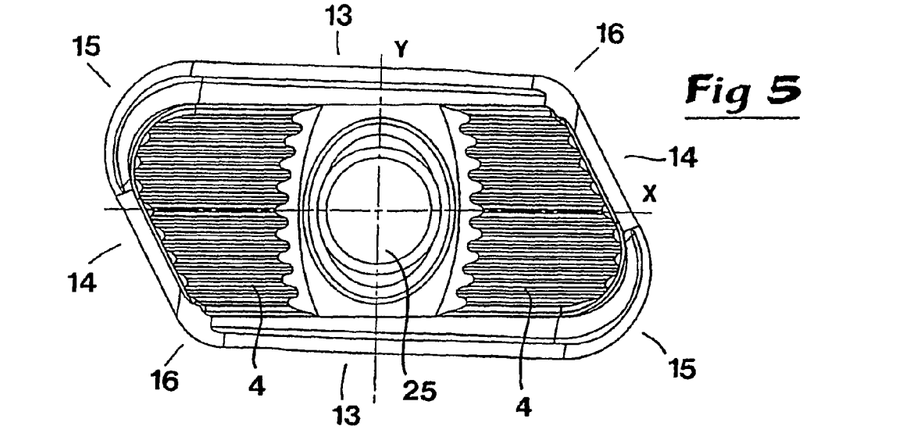
FIG. 5 is a planar view from below of the same cutting insert.
Figure 7:
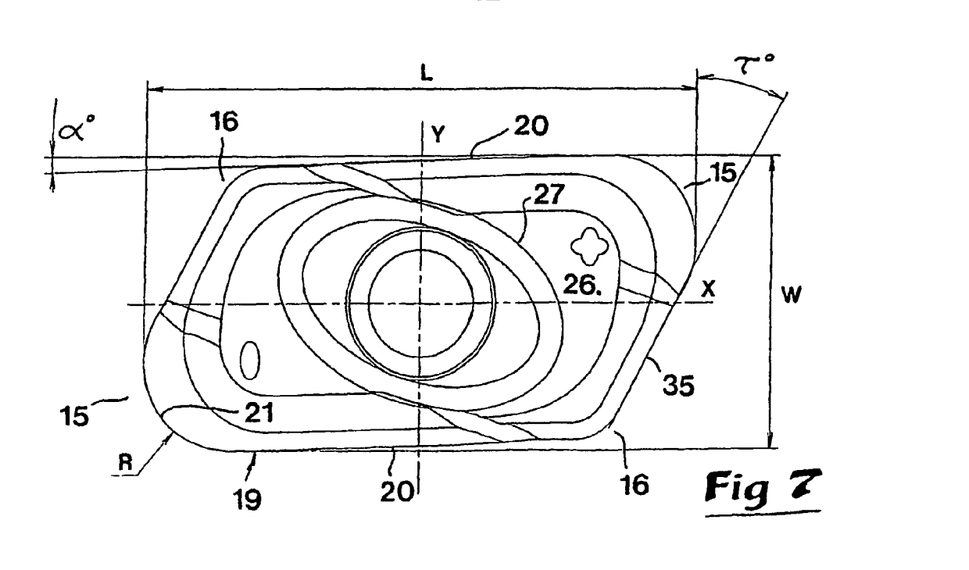
FIG. 7 is a planar view from above of the same cutting insert.

In the shown, preferred embodiment, the cutting insert has a rhomboid basic shape, the two major-edge portions 20 extending along long sides 13 of the cutting insert. In FIGS. 5 and 7, the cutting insert is shown inserted into a conceived system of co-ordinates having a first co-ordinate axis or X-axis, and a second co-ordinate axis or Y-axis. The shape of the cutting insert is symmetrical in relation to said two co-ordinate axes.

In FIG. 5 it is seen that in the preferred embodiment, the cutting insert has two connecting surfaces 4, which are placed on both sides of a central, through hole 25 in the cutting insert. Each one of the two connecting surfaces 4 includes a plurality of ridges that are spaced apart via grooves and mutually parallel. Said ridges and grooves are parallel to the X-axis. The two connecting surfaces are spaced apart from the hole, i.e., end at a distance from the same.

The individual major-edge portion 20 extends generally obliquely in relation to the X-axis so far that the front end point 22 is situated at a greater distance from the X-axis than the rear end point 23. In the example, the angle of inclination α (see FIG. 7) between the individual major-edge portion 20 and the X-axis is 1.8°.

In the embodiment illustrated in FIGS. 3-10, the major-edge portion 20 of the cutting edge 19 is arched. This arc-shape is obtained by the fact that the part of the clearance surface 18 that is connected to the major-edge portion 20 is formed with a slightly marked convex curvature. The curvature is, however, so small that the arc-shape of the major-edge portion 20 is not visible to the naked eye in FIGS. 3-10.

Figure 6:
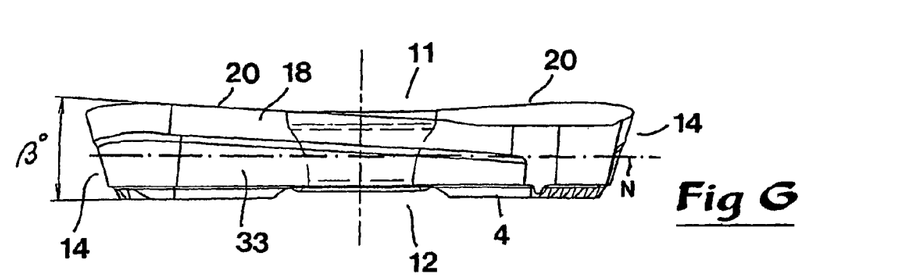
FIG. 6 is a side view of the cutting insert.

In FIG. 6, a neutral plane N is shown by a dash-dotted line, which plane is parallel to the bottom side of the cutting insert such as this is represented by the tops or crown surfaces on the ridges that are included in the connecting surfaces 4.

Figure 3:
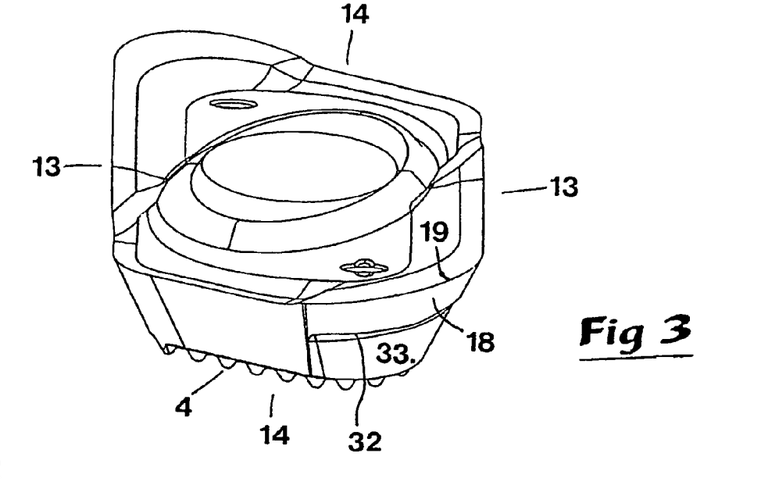
FIG. 3 is a perspective view showing a milling insert according to a preferred embodiment of the invention seen obliquely from above and from a short end.
Figure 4:
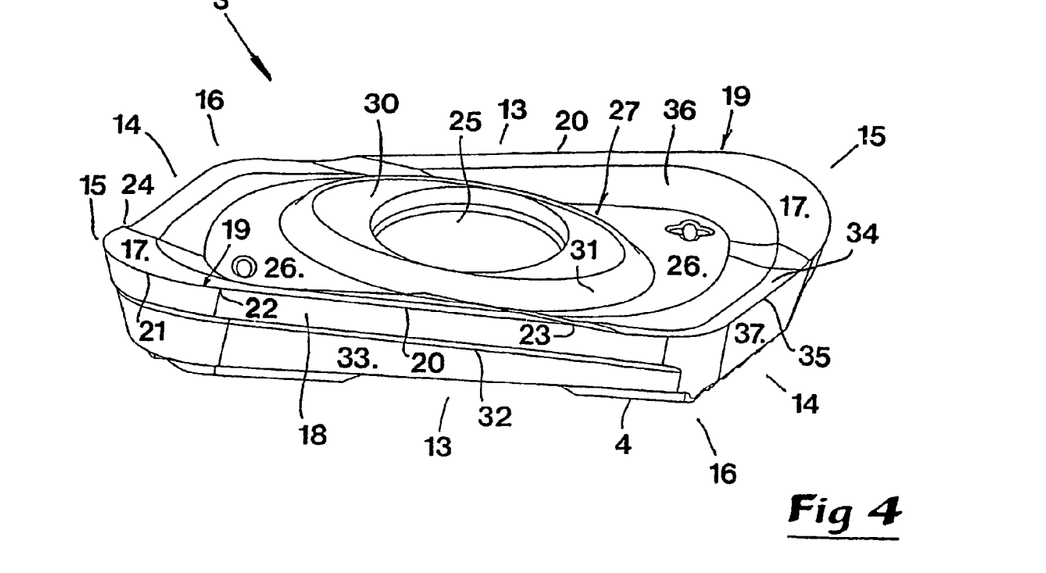
FIG. 4 is a perspective view showing the cutting insert illustrated in FIG. 3 seen from a long side.
Figure 8:
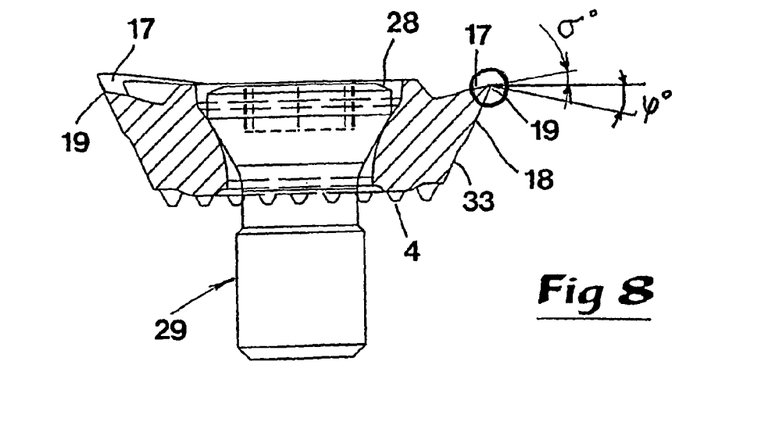
FIG. 8 is a cross-section through the cutting insert shown together with a fixing screw.

Reference is now made to FIGS. 3 and 4, in which it is seen that the cutting edges 19 together with the chip surfaces 17 are formed on border-like, peripherical material portions in relation to which a valley-like surface 26 is countersunk. This valley surface is planar and parallel to the neutral plane N. Centrally on the valley surface 26, an elevated material portion 27 is formed. In the example, where the cutting insert is formed with a central hole 25, the elevated material portion 27 has the shape of an endless collar in which a head 28 of a fixing screw 29 (see FIG. 8) can be accommodated in a countersunk and protected state. Thus, as is seen in FIG. 8, the top side of the screw head 28 is located on a lower level than a surrounding planar top surface 30 on the collar 27 when the screw is tightened. From the planar top side 30 of the collar, a side surface 31 extends obliquely downward/outward toward the valley surface 26. This side surface, which is endless, may in practice serve as a chip breaker for the chips that are removed by means of the individual, active cutting edge 19. In the embodiment shown, in which the cutting insert has a rhomboid basic shape, the collar 27 has an elongate, oval shape and extends diagonally essentially in the direction between the obtuse corners 16 of the cutting insert (see also FIG. 7).

As is further seen in FIGS. 3 and 4, the individual clearance surface 18 extends downward from the cutting edge 19 to a shoulder designated 32, which defines a narrowed base surface 33 under the proper clearance surface. This base surface 33 may advantageously have a larger area than the clearance surface 18. In other words, the clearance surface is comparatively narrow. For this reason, the clearance surface can be the ground in a simple and efficient way, the narrowed base surface giving great freedom in forming the clearance surface and thereby the cutting edge with the desired shape.

As previously has been mentioned, the two cutting edges 19 form primary cutting edges. Between these primary cutting edges together with the appurtenant chip surfaces 17, the border-like material portion around the valley surface 26 is countersunk. More precisely, two secondary chip surfaces 34 adjacent to two secondary cutting edges 35 are countersunk in relation to the chip surfaces 17.

The individual primary cutting edge 19 is advantageously—though not necessarily—sharpened, more precisely by the fact that the chip surface 17 as well as the clearance surface 18 is ground. In this connection, it should be pointed out that the individual chip surface 17 is planar in its entirety and inclined in two different directions in relation to the neutral plane N.

Figure 9:
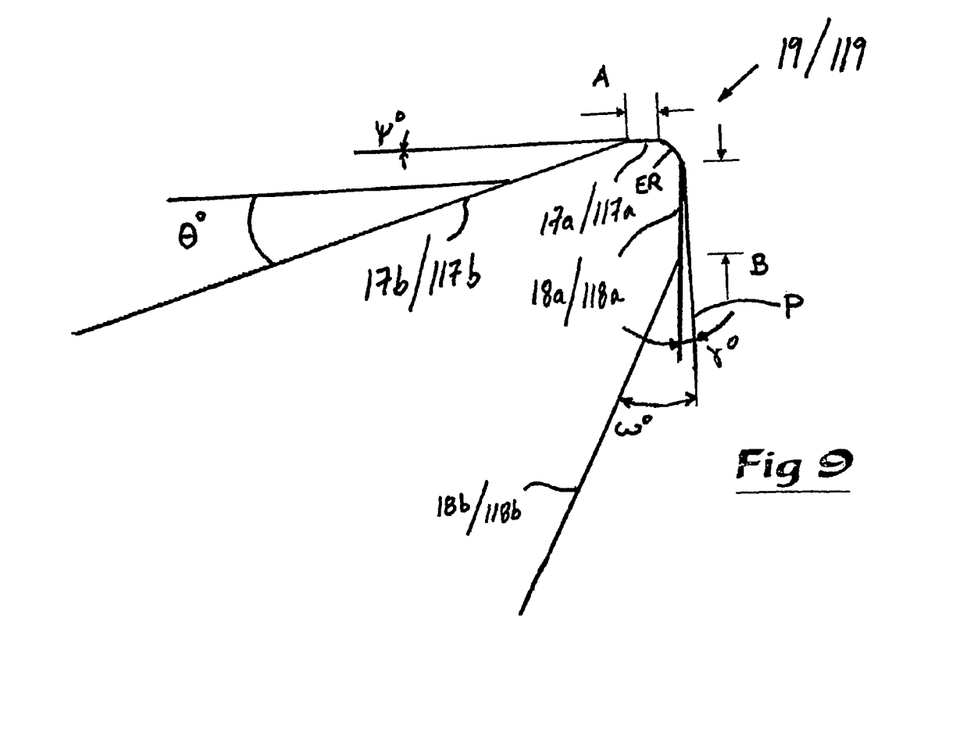
FIG. 9 is a cross section view on an enlarged scale of a detail from FIG. 8.

In a first, substantially radial direction, the chip surface 17 is inclined so far that the distance between the neutral plane N and the end of the chip surface that is situated farthest from the appurtenant edge 19, or that is situated closest to the X-axis, is smaller than the distance between the neutral plane and other parts of the chip surface. This angle of inclination is designated σ. According to recently acquired knowledge forming the base of the invention, in machining, the rake angle should amount to between 25 and 28° for optimal machining performance. According to the invention, this is accomplished in that the insert pocket 5 is arranged to secure the cutting insert 3 in a position in which the resulting angle of inclination of the chip surface 17 in relation to the centre axis C of the tool amounts to between 25 and 28°. In FIG. 9, this angle of inclination is indicated by θ. It should be appreciated that this angle is a result of, on one hand, the inclination, or slope, of the insert pocket 5 in relation to the centre axis of the tool, and on the other hand the inclination of the chip surface 17 in relation to the neutral plane N parallel to the bottom side of the cutting insert. Thus, the resulting rake angle of the milling tool can be obtained by a large number of combinations of inclinations of the insert pocket and chip surface, respectively.

As has been pointed out previously, in preferred embodiments, the radial angle of the connecting surface/insert pocket 5 is within the range of 10-25°. For the achievement of optimum rake angle in the range of 25-28°, in preferred embodiments, the angle σ in question is preferably within the range of 3-15°. Suitably, the angle σ is within 8-12°, the radial angle of the insert pocket then suitably being within the range of 13-20°. In the example, the angle σ amounts to 10° and the radial angle of the insert pocket to 16°.

Thus, in a second, substantially axial direction, the chip surface 17 is inclined so far that a front portion of the same adjacent to the minor-edge portion 21 is located at a greater distance from the neutral plane N than a rear portion of the same. In FIG. 6, this axial angle of inclination is designated β. The angle β may be within the range of 1-10°, suitably 3-5°, and amounts to 4° in the example.

It should be pointed out that the primary chip surfaces 17 as well as the secondary chip surfaces 34 internally transform into a transition surface 36, which extends obliquely downward/inward toward the valley surface 26. The same transition surface 36 may advantageously be concavely curved. Regardless of the primary cutting edges 19 being sharpened or not, the secondary cutting edges 35 may, if desired, remain unground. However, the secondary cutting edges may be single ground, more precisely by grinding only the clearance surface 37. The chip surfaces 34 may advantageously have concavely curved shape, which is accomplished directly in connection with compression moulding.

Figure 10:
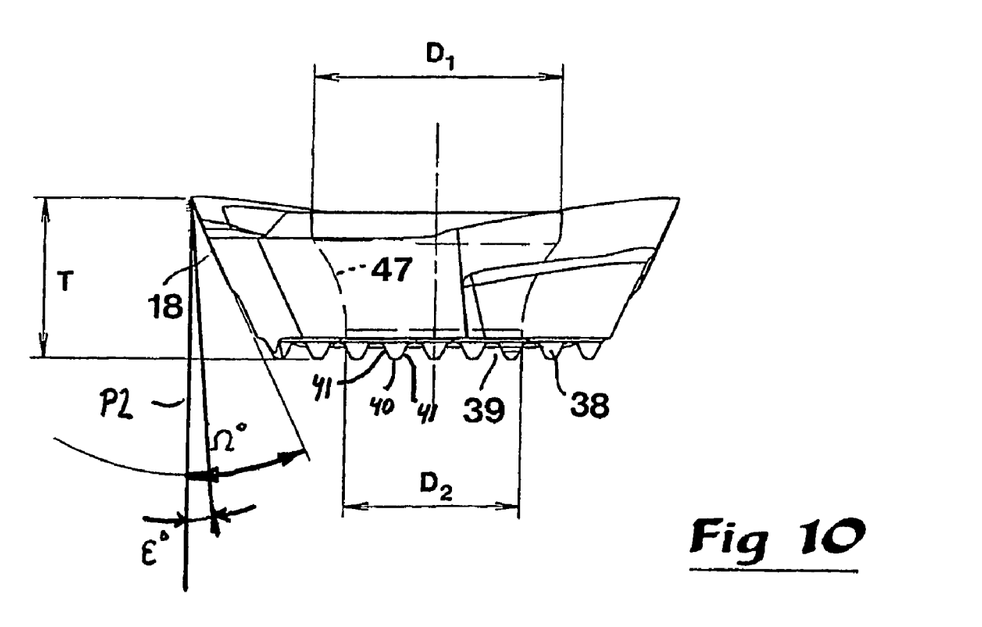
FIG. 10 is an end view of the cutting insert.

Reference is now made to FIGS. 8-10. In FIG. 9, the encircled area from the cross-section in FIG. 8 taken through the major-edge portion 20 is schematically shown on an enlarged scale (not necessarily true to scale), which illustrates the area in close connection to the cutting edge 19. In FIG. 9, it is clearly seen that the cutting edge 19 has an arc-shape cross section-wise. The smaller the radius of curvature of this arc-shape, the sharper the cutting edge 19 is. The radius of curvature of the cutting edge 19 according to the invention is within the range of 5-20 μm, suitably at least 8 μm and at most 12 μm. In the example, this edge radius ER, which by a person skilled in the art usually is denominated edge rounding, amounts to 10 μm.

The chip surface 17 is formed with a reinforcement bevel 17a, which extends from the cutting edge 19 in the direction of the centre of the cutting insert, i.e., in the direction of the X-axis illustrated in FIG. 5 and FIG. 7 or in the direction inwards towards the hole 25. The reinforcement bevel 17a transforms into a main chip portion 17b. In accordance with the invention, the reinforcement bevel is formed very narrow. Advantageously, the extension of the reinforcement bevel from the cutting edge 19 to the main chip portion 17b is within the range of 0.05-0.15 mm. In the example, the extension A of the main chip portion amounts to 0.10 mm.

In the above mentioned first, substantially radial direction, also the reinforcement bevel 17a of the chip surface is inclined so far that the distance between the neutral plane N and the end of the reinforcement bevel that is situated farthest from the appurtenant edge 19, or that is situated closest to the X-axis, is greater than the distance between the neutral plane and other parts of the reinforcement bevel. This angle of inclination is designated φ, see FIG. 8. According to additional, recently acquired knowledge forming the base of the invention, in machining, the angle of inclination of the reinforcement bevel 17a should be larger than −5°, but smaller than +5° for optimal machining performance. According to the invention, this is accomplished in that the insert pocket 5 is arranged to secure the cutting insert 3 in a position in which the resulting angle of inclination of the reinforcement bevel 17a in relation to the centre axis C of the tool is in the range of −5-5°. In FIG. 9, this angle of inclination is indicated by ψ. It should be appreciated that also this angle is a result of, on one hand, the inclination, or slope, of the insert pocket 5 in relation to the centre axis of the tool, and on the other hand the inclination of the reinforcement bevel 17a in relation to the neutral plane N parallel to the bottom side of the cutting insert. Thus, the resulting angle of inclination of the reinforcement bevel of the milling tool can be obtained by a large number of combinations of inclinations of the insert pocket and reinforcement bevel, respectively.

As has been pointed out previously, in preferred embodiments, the radial angle of the connecting surface/insert pocket 5 is within the range of 10-25°. For the achievement of optimum angle of inclination of the reinforcement bevel in the range of −5-5°, in preferred embodiments, the angle φ in question is preferably within the range of −30° to −5°. Suitably, the angle φ is within −25° to −8°, the radial angle of the insert pocket then suitably being within the range of 13-20°. In the example, the angle φ amounts to −16° and, as has already been mentioned above, the radial angle of the insert pocket amounts to 16°. Consequently, the resulting angle ψ is 0° in the example.

In FIG. 9, it is further seen that the individual clearance surface 18 is formed with a clearance bevel 18a, which extends from the cutting edge 19 in the direction of the bottom side 12 of the cutting insert and transforms into a main clearance portion 18b. In accordance with the invention, also the clearance bevel is formed very narrow. Advantageously, the extension B of the clearance bevel from the cutting edge 19 to the main clearance portion 18b is within the range of 0.05 mm-0.30 mm, suitably at least 0.10 mm. In the example, this extension is 0.20 mm.

According to additional, recently acquired knowledge forming the base of the invention, in machining, the clearance angle of the clearance bevel 18a should be larger than 0°, but smaller than 3° for optimal machining performance. According to the invention, this is accomplished in that the insert pocket 5 is arranged to secure the cutting insert 3 in a position in which the clearance bevel 18a has an angle of inclination in the range of 0-3° in relation to a reference plane P parallel to the centre axis C of the tool and touching the periphery of the tool. In FIG. 9, this angle of inclination is indicated by γ. It should be appreciated that also this angle is a result of, on one hand, the inclination, or slope, of the insert pocket 5 in relation to the centre axis of the tool, and on the other hand the inclination of the clearance bevel 18a in relation to a reference plane P2 (see FIG. 10) orthogonal to the neutral plane N parallel to the bottom side of the cutting insert. Thus, the resulting clearance angle of the clearance bevel of the milling tool can be obtained by a large a number of combinations of inclinations of the insert pocket and clearance bevel, respectively.

As has been pointed out previously, in preferred embodiments, the radial angle of the connecting surface/insert pocket 5 is within the range of 10-25°. For the achievement of optimum clearance angle of the clearance bevel in the range of 0-3°, in preferred embodiments, the angle of inclination ε of the clearance bevel 18a in relation to the reference plane P2 is preferably within the range of 10° to 28°. Suitably, the angle ε is within 13° to 23°, the radial angle of the insert pocket then suitably being within the range of 13-20°. In the example, the angle ε amounts to 17° and, as already has been mentioned above, the radial angle of the insert pocket to 16°, which gives a resulting clearance angle γ of the clearance bevel 18a of 1°.

Furthermore, according to the invention, the clearance angle of the main clearance portion should be larger than the clearance angle of the clearance bevel. The clearance angle Ω (see FIG. 10) of the main clearance portion 18b in relation to the reference plane P2 orthogonal to the neutral plane N may advantageously be larger than 15°, suitably larger than 20°. In the example, the clearance angle Ω amounts to 25°, which gives a resulting clearance angle ω of the main clearance portion 18b of 9°.

If the angle σ amounts to 10°, accordingly the acute angle between the surfaces 17, 18 (i.e., between the main chip portion 17b and the main clearance portion 18b) adjacent to the major-edge portion 19 becomes 55°. In other words, the cutting insert has a very positive cutting geometry.

Reference is now made to FIGS. 2 and 10, which closer illustrate the nature of the connecting surfaces 4, 5. Each one of the two spaced-apart connecting surfaces 4 that are present on the bottom side of the cutting insert includes a plurality of long narrow, mutually parallel ridges 38, which are spaced apart by grooves 39. The individual ridge has a cross section-wise tapering shape. More precisely, the individual ridge is defined by a crown surface 40 and two flanks 41, which are inclined at an angle of 60° to each other. In an analogous way, the connecting surface 5 formed in the basic body 1 includes a plurality of parallel ridges 42, which are spaced apart by grooves 43 and which correspondingly are defined by crown surfaces and flanks. In this connection, it should be pointed out that the material in the cutting insert 3 (which may consist of conventional cemented carbide or the like) usually is considerably harder than the material in the basic body of the milling tool (which may consist of steel, aluminium or the like). Here, it should be mentioned that the cutting insert also may be mounted on an intermediate shim plate having ridge-provided connecting surfaces.

Below, an embodiment of the milling insert according to the invention follows, concretized in respect of dimension and angle data. The cutting insert may have a length L (see FIG. 7) of 30 mm and a width W of 16 mm, the thickness T (see FIG. 10) amounting to 5 mm. The radius R of the individual minor-edge portion 21 at each one of the acute corners of the cutting insert is 5 mm. In this connection, the angle of inclination τ between the individual secondary cutting edge 35 (which is straight) and the Y-axis amounts to 28°. As already has been mentioned above, the angle α amounts to 1.8°, the angle β to 4°, the angle δ to 10°, and the angle Ω to 25°. The central, rotationally symmetrically shaped hole 25 tapers in the direction from the top side of the cutting insert toward the bottom side. The largest diameter $D_1$ of the hole amounts to 8 mm, while the smallest diameter $D_2$ amounts to 5.7 mm. Upon tightening, a conical surface of the screw head 28 is pressed against a convexly curved shoulder surface 47 in the hole.

Figure 11:
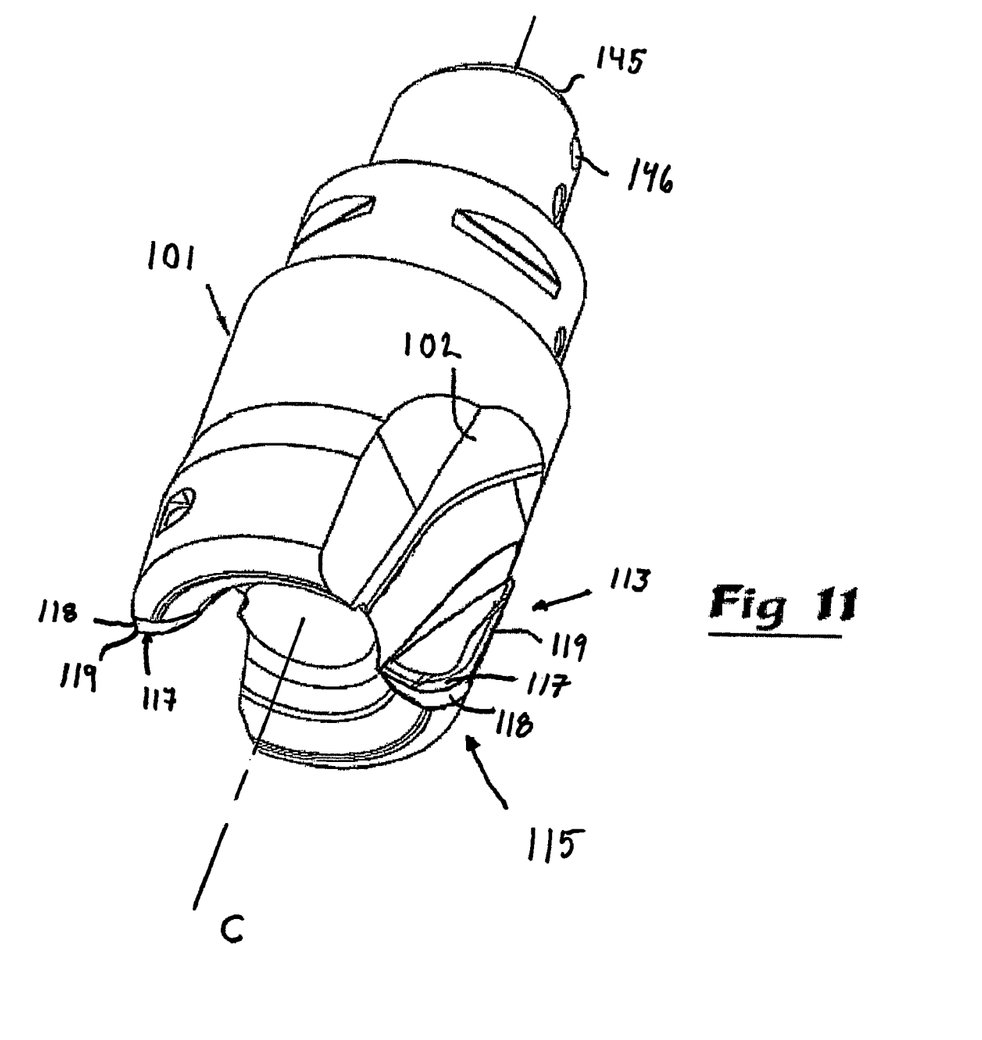
FIG. 11 is a solid milling tool according to a preferred embodiment of the invention.

Above, reference being made to FIGS. 1-10, embodiment of the invention is described in the form of a milling tool comprising a plurality of detachable cutting inserts, on which the cutting edges are arranged. In FIG. 11, another embodiment of the invention is illustrated in the form of a solid milling tool. The solid tool differs principally from the embodiment illustrated in FIGS. 1-10 in having cutting edges formed directly in the basic body as an integrated part of the same, instead of on cutting inserts that are releasably securable in the basic body. Consequently, the solid milling tool is manufactured integrally from one and the same blank, preferably from conventional cemented carbide. Thus, the solid milling tool according to the invention comprises a basic body 101 having a rotationally symmetrical basic shape, which has a front end surface 144 and a rear end surface 145 including means, e.g., a recess 146, for the connection of the basic body 101 to a driving spindle. The basic body is rotatable around a geometrical centre axis C. In the envelope surface of the basic body 101, two chip channels 102 are formed.

Adjacent to said chip channels, directly incorporated in the basic body as an integrated part thereof, cutting edges are arranged generally designated 119. These cutting edges are formed between chip surfaces 117 on the top side of the cutting part and clearance surfaces 118 along the periphery sides. Below, the same edges 119 are denominated primary cutting edges. Each individual primary cutting edge 119 includes a major-edge portion, which extends substantially in the same the direction as the centre axis, as well as a minor-edge portion formed adjacent to an acute corner 115 and having markedly round, e.g., partially circular shape.

The tool geometry is markedly positive so far that the chip surface 117 is inclined in relation to the centre axis C while forming a positive angle of inclination, which preferably amounts to between 25 and 28°. In the example, the same angle of inclination, in FIG. 9 designated θ, amounts to 26°.

The design of the cutting edge 119 in cross-section and also the design of the chip surface 117 and of the clearance side 118 adjacent to the cutting edge 119 is analogous to the design of the cutting edge 19 illustrated in FIG. 9. (For the sake of clarity, the reference designations corresponding to the embodiment according to FIG. 11 have been inserted into FIG. 9). Hence, the cutting edge 119 has an arc-shape cross section-wise. The smaller the radius of curvature of this arc-shape, the sharper the cutting edge 119 is. The radius of curvature of the cutting edge 119 according to the invention is within the range of 5-20 µm, suitably at least 8 µm and at most 12 µm. In the example, this edge radius ER, which by a person skilled in the art usually is denominated edge rounding, amounts to 10 µm.

The chip surface 117 is formed with a reinforcement bevel 117a, which extends from the cutting edge 119 in the direction of the centre of the tool. The reinforcement bevel 117a transforms into a main chip portion 117b. In accordance with the invention, the reinforcement bevel is formed very narrow. Advantageously, the extension of the reinforcement bevel from the cutting edge 19 to the main chip portion 17b is within the range of 0.05-0.15 mm. In the example, the extension A of the main chip portion amounts to 0.10 mm.

The reinforcement bevel 117a of the chip surface is inclined in relation to the centre axis C. This angle of inclination is designated ψ, see FIG. 9, and is advantageously larger than −5°, but smaller than +5°. In the example, the angle ψ amounts to 0°.

In FIG. 9, it is further seen that the individual clearance surface 118 is formed with a clearance bevel 118a, which extends from the cutting edge 119 in the periphery direction of the tool and transforms into a main clearance portion 118b. In accordance with the invention, also the clearance bevel is formed very narrow. Advantageously, the extension B of the clearance bevel from the cutting edge 119 to the main clearance portion 118b is within the range of 0.05-0.30 mm, suitably at least 0.10 mm. In the example, this extension is 0.20 mm.

The angle of inclination of the clearance bevel 118a in relation to a reference plane P parallel to the centre axis C of the tool and touching the periphery of the tool is advantageously in the range of 0-3°. In FIG. 9, this angle of inclination is indicated by γ and amounts to 1° in the example.

Furthermore, the clearance angle of the main clearance portion is larger than the clearance angle of the clearance bevel. The clearance angle ω (see FIG. 9) of the main clearance portion 118b in relation to the reference plane P may advantageously be larger than 5°. In the example, the clearance angle ω amounts to 9°. Thus, the acute angle between the surfaces 117b, 118b adjacent to the cutting edge becomes 55°. In other words, the solid milling tool has a very positive geometry.

FEASIBLE MODIFICATIONS OF THE INVENTION

The invention is not only limited to the embodiments described above and shown in the drawings. Although the milling tool, the cutting insert as well as the solid milling tool according to the invention above have been described above all for the machining of such soft materials as aluminium, the same may also be used for the machining of other, suitably metallic material, such as steel, titanium and the like.

The invention claimed is:

1. A milling tool for chip-removing machining, comprising a basic body rotatable around a geometrical centre axis and a plurality of peripherically spaced-apart, detachable cutting inserts, which separately are securable in insert pockets adjacent to chip channels formed in the basic body, the individual cutting insert having at least one edge formed between a chip surface on the top side of the cutting insert and a clearance surface along the periphery side of the cutting insert, the individual insert pocket is arranged to secure the individual cutting insert in a position in which the chip surface is inclined in relation to the centre axis while forming a positive angle of inclination wherein a value of the angle of inclination (θ) between the chip surface and the centre axis is within the range of 25-28°, the cutting edge cross section-wise has an arc-shape having a radius of curvature within the range of 5-20 µm, the clearance surface of the cutting insert is formed with a clearance bevel, which extends from the cutting edge in the direction of a bottom side of the cutting insert to a main clearance portion, a clearance angle (γ) of the clearance bevel is larger than 0°, but smaller than 3°, a clearance angle (ω) of the main clearance portion is larger than the clearance angle (γ) of the clearance bevel, an extension of the clearance bevel from the cutting edge to the main clearance portion is within the range of 0.05-0.30 mm, the chip surface is formed with a reinforcement bevel, which extends from the cutting edge in the direction of the centre of the cutting insert and transforms into a main chip portion, an angle of inclination (ψ) of the reinforcement bevel in relation to the centre axis being larger than −5°, but smaller than +5°, and an extension of the reinforcement bevel from the cutting edge to the main chip portion is within the range of 0.05-0.15 mm.

2. The milling tool according to claim 1, wherein said radius of curvature is within the range of 8 µm-20 µm.

3. The milling tool according to claim 1, wherein said radius of curvature is within the range of 5 µm-12 µm.

4. The milling tool according to claim 1, wherein the clearance angle (γ) of the clearance bevel is larger than 1°, but smaller than 3°.

5. The milling tool according to claim 1, wherein the extension of the clearance bevel from the cutting edge to the main clearance portion is within the range of 0.10 mm-0.30 mm.

6. The milling tool according to claim 1, wherein the reinforcement bevel of the chip surface adjacent to the individual cutting edge is planar in its entirety.

7. The milling tool according to claim 1, wherein the clearance bevel of the clearance surface adjacent to the individual cutting edge is planar in its entirety.

8. An indexable milling insert having a polygonal basic shape and cutting geometry, comprising a top side, a bottom side, four peripherical sides, two of the four peripherical sides forming a pair of first, mutually opposite sides and another two of the four peripherical sides forming a pair of second, mutually opposite sides that meet the pair of first, mutually opposite sides at corners, as well as two material-cutting edges formed between a chip surface on the top side of the insert and clearance surfaces along the periphery sides, wherein the chip surface is inclined in a first direction in relation to a neutral plane parallel to the bottom side of the insert, so that a distance between the neutral plane and an end of the chip surface that is situated farthest from an appurtenant edge is smaller than a distance between the neutral plane and other parts of the chip surface, an angle of inclination (σ) of the chip surface in said first direction in relation to the neutral plane is within the range of 3-15°, the two cutting edges in cross-section each have an arc-shape having a radius of curvature within the range of 5-20 µm, the clearance surfaces are each formed with a clearance bevel, which extends from one of the two cutting edges in a direction of the bottom side to a main clearance portion, an angle of inclination ($\epsilon$) of the clearance bevel in relation to a reference plane orthogonal to the neutral plane and touching one of the two cutting edges is larger than 10°, but smaller than 28°, a clearance angle ($\Omega$) of the main clearance portion in relation to a reference plane touching one of the two cutting edges is larger than the clearance angle ($\epsilon$) of the clearance bevel, an extension of the clearance bevel from one of the two cutting edges to the main clearance portion is within the range of 0.05-0.30 mm, the chip surface is formed with a reinforcement bevel, which extends from one of the two cutting edges in the direction of the centre of the cutting insert and transforms into a main chip portion, an angle of inclination ($\phi$) of the reinforcement bevel in relation to the neutral plane being larger than −30°, but smaller than −5°, and an extension of the reinforcement bevel from one of the two cutting edges to the main chip portion is within the range of 0.05-0.15 mm.

9. The indexable milling insert according to claim 8, wherein said radius of curvature is within the range of 8 µm-20 µm.

10. The indexable milling insert according to claim 8, wherein said radius of curvature is within the range of 5 µm-12 µm.

11. The indexable milling insert according to claim 8, wherein the angle of inclination ($\sigma$) of the chip surface is within the range of 8°-15°.

12. The indexable milling insert according to claim 8, wherein the angle of inclination ($\sigma$) of the chip surface is within the range of 5°-12°.

13. The indexable milling insert according to claim 8, wherein the clearance angle ($\epsilon$) of the clearance bevel is larger than 13°, but smaller than 28°.

14. The indexable milling insert according to claim 8, wherein the extension of the clearance bevel from the cutting edge to the main clearance portion is within the range of 0.10 mm-0.30 mm.

15. The indexable milling insert according to claim 8, wherein the reinforcement bevel of the chip surface adjacent to the individual cutting edge is planar in its entirety.

16. The indexable milling insert according to claim 8, wherein the clearance bevel of the clearance surface adjacent to the individual cutting edge is planar in its entirety.

17. A solid milling tool for chip-removing machining, comprising a basic body rotatable around a geometrical centre axis in which body a plurality of peripherically spaced-apart chip channels are formed, each chip channel being provided with an appurtenant edge formed between a chip surface and a clearance surface along a periphery side of the milling tool, the chip surface is inclined in relation to the centre axis while forming a positive angle of inclination, wherein a value of the angle of inclination ($\theta$) between the chip surface and the centre axis is within the range of 25-28°, a cutting edge cross section-wise has an arc-shape having a radius of curvature within the range of 5-20 µm, the clearance surface is formed with a clearance bevel, which extends from the cutting edge in a periphery direction of the milling tool to a main clearance portion, a clearance angle ($\gamma$) of the clearance bevel is larger than 0°, but smaller than 3°, a clearance angle ($\omega$) of the main clearance portion is larger than the clearance angle ($\gamma$) of the clearance bevel, an extension of the clearance bevel from the cutting edge to the main clearance portion is within the range of 0.05-0.30 mm, the chip surface is formed with a reinforcement bevel, which extends from the cutting edge in a direction radially inward toward the centre of the milling tool to a main chip portion, an angle of inclination ($\psi$) of the reinforcement bevel in relation to the centre axis being larger than −5°, but smaller than +5°, an extension of the reinforcement bevel from the cutting edge to the main chip portion is within the range of 0.05-0.15 mm.

18. The solid milling tool according to claim 17, wherein the radius of curvature is within the range of 8-12 µm.

* * * * *